Oct. 5, 1926.
H. H. HICKS
1,601,800
SPRING SUSPENSION
Filed August 8, 1924     2 Sheets-Sheet 1
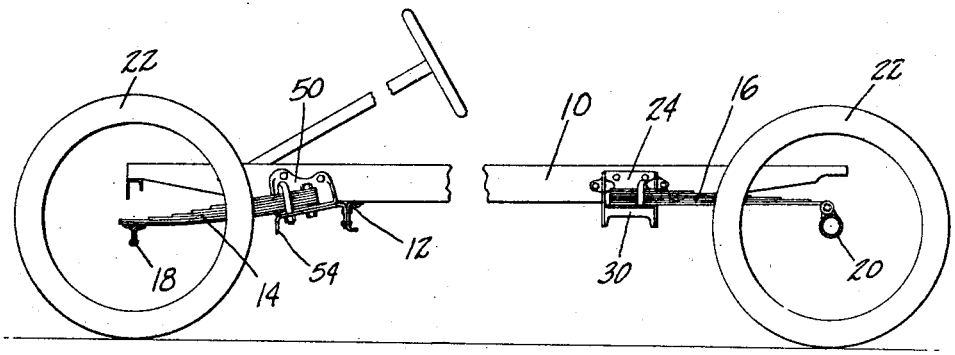
Fig. 1
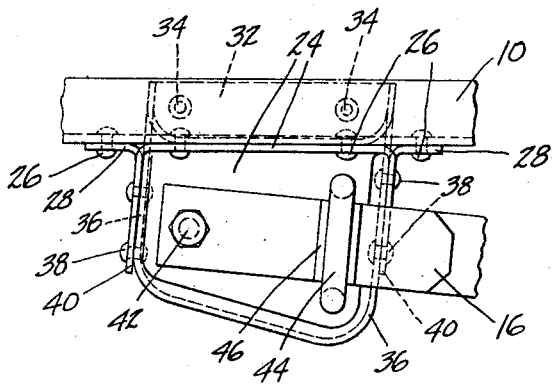
Fig. 2
Fig. 4
Fig. 3
Inventor
Harlie H. Hicks
By his Attorneys Oct. 5, 1926.
H. H. HICKS
SPRING SUSPENSION
Filed August 8, 1924
1,601,800
2 Sheets-Sheet 2
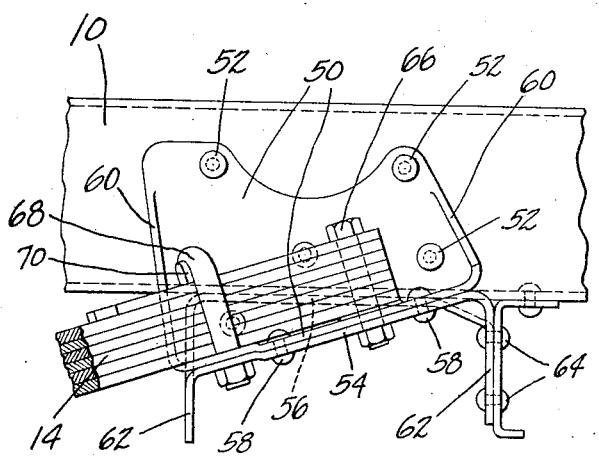
Fig. 5
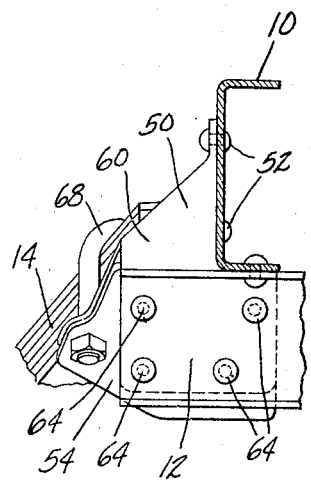
Fig. 6
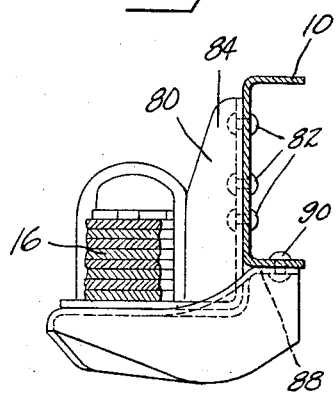
Fig. 8
Fig. 7
Inventor
Harlie H. Hicks
By his Attorneys
Blackmore, Spencer & Flint Patented Oct. 5, 1926.

1,601,800

UNITED STATES PATENT OFFICE.

HARLIE H. HICKS, OF DETROIT, MICHIGAN, ASSIGNOR TO GENERAL MOTORS CORPORATION, OF DETROIT, MICHIGAN, A CORPORATION OF DELAWARE.

SPRING SUSPENSION.

Application filed August 8, 1924. Serial No. 730,857.

This invention relates to automobile chassis, and has for its principal object a novel arrangement and construction of the parts of the spring suspension permitting the use of an inexpensive yet exceptionally strong spring bracket of pressed sheet metal. In a preferred construction, the bracket is made in two pieces, the upper one having a vertical part engaging and secured to the outer face of the side chassis frame member and a generally horizontal part supporting one end of a quarter-elliptic spring, and the lower one secured to the bottom flange of the chassis side member and lapping the spring-supporting part of the first piece of the bracket, the spring-securing bolts being arranged to clamp the spring and the lapping parts firmly together. The lower bracket piece may have downwardly-extending reinforcing flanges, and, if desired, one of these flanges may be permanently secured to one of the cross members of the frame.

The above and other objects and advantages of the invention will be apparent from the following description of the illustrative embodiments shown in the accompanying drawings, in which:

Figure 1 is a diagrammatic vertical section longitudinally of a Chevrolet chassis, showing the spring arrangement;

Figure 2 is a top plan view of the rear spring bracket, with the end of the spring in place;

Figure 3 is a side elevation of the rear spring bracket and the end of the spring;

Figure 4 is a rear elevation of the rear spring bracket, with the spring shown in vertical section;

Figures 5 and 6 are respectively side and rear elevations of the front spring bracket, parts of the frame and spring being shown; and Figures 7 and 8 are respectively side and rear elevations of a modified rear spring bracket, parts of the frame and spring being shown.

In Figure 1 is shown diagrammatically a chassis including a chassis frame having channeled side members 10 and cross members 12, the frame being supported by front quarter-elliptic springs 14 and rear quarter-elliptic springs 16 on a front axle 18 and a rear axle 20 provided with the usual road wheels 22.

Each rear spring 16 is attached to the frame by a novel pressed metal bracket, one part of which is an upper member 24 having a vertical portion secured to the outer face of side frame member 10 by rivets 26, and a generally horizontal bottom portion supporting the end of the spring. Lugs 28 may be struck out from the vertical portion and bent around through 180° to receive some of the rivets 26. The other part of the bracket is a lower member 30, generally channel-shaped in vertical longitudinal section, and having an upper portion lapping the bottom portion of member 24, by engaging its lower surface, and also having a portion 32 engaging the lower surface of the bottom flange of side frame member 10 and secured thereto by rivets 34. The lower member 30 of the bracket has end flanges 36 secured by rivets 38 to vertical end flanges 40 on the upper member 24. Spring 16 is held by a straight bolt 42 and a U-bolt 44, which bolts clamp the spring and the two bracket members firmly together. A suitable block 46 is provided for the U-bolt 44.

Each front spring 14 is attached to the frame by a pressed metal bracket, the upper part of which is a member 50 having a vertical portion secured to the outer face of side frame member 10 by rivets 52, and a generally horizontal portion supporting the end of the spring. The lower part of the front bracket is a member 54, generally channel-shaped in vertical longitudinal section, and having an upper portion lapping the bottom portion of member 50 by engaging its lower surface, and also having a portion 56 engaging the lower surface of the bottom flange of side frame member 10 and secured thereto by rivets or in any other desired manner. The bottom portion of the upper member 50, and the upper portion of the lower member 54, may be secured together by rivets 58, so that the bracket can be handled as a unit. The upper member 50 is shown with end reinforcing flanges 62. One of the flanges of member 54 is secured to one of the cross members 12 by rivets 64. Spring 14 is held by a straight bolt 66, and a U-bolt 68 having a block 70, the bolts serving to clamp the spring and the two parts of the bracket firmly together.

In the modification shown in Figures 7 and 8, the spring 16 is attached to the frame by a pressed metal bracket, the upper part of which is a member 80 having a vertical portion secured to the outer face of side frame member 10 by rivets 82, and having a generally horizontal bottom portion supporting the end of the spring. Member 80 has end reinforcing flanges 84. The lower part of the bracket is a member 86, generally channel-shaped in longitudinal vertical section, and having an upper portion lapping the lower portion of the upper member 80, and if desired riveted thereto. Member 86 also has a portion 88 engaging the lower surface of the bottom flange of side frame member 10, and secured thereto by rivets 90. The spring is held as before by a straight bolt 42 and a U-bolt 44 with a block 46.

While several embodiments of the invention have been described in detail, it is not my intention to limit its scope to those particular embodiments, or otherwise than by the terms of the appended claims.

I claim:

1. A spring suspension including a quarter-elliptic spring and a channeled side chassis frame member and a bracket, the bracket comprising, in combination, a first pressed sheet metal member having a vertical back secured to the outer face of the side frame member and a generally horizontal portion disposed beneath the end of the quarter elliptic spring and an integral reinforcing end flange, and a second pressed sheet metal member generally channel-shaped in longitudinal vertical section and with a portion arranged below and lapping the horizontal portion of the first member and another portion engaging and secured to the bottom of the lower flange of the channeled side frame member, the flanges of the second member being generally vertical and extending downwardly to form reinforcements for the bracket, together with bolts clamping the spring and the lapping horizontal portions of the two pressed metal members together.

2. A spring suspension including a quarter-elliptic spring, a channeled side chassis frame member, a cross frame member secured to the bottom of the side frame member and having an end extending beyond the vertical plane of the side member, and a bracket, the bracket comprising, in combination, a first pressed sheet metal member having a vertical back secured to the outer face of the side frame member and a generally horizontal portion located beneath the end of the quarter elliptic spring and an integral reinforcing end flange, and a second pressed sheet metal member generally channel-shaped in longitudinal vertical section and with a portion arranged beneath and lapping the horizontal portion of the first member and another portion engaging and secured to the bottom of the lower flange of the channeled side frame member, the flanges of the second member being generally vertical and extending downwardly to form reinforcements for the bracket, one of the vertical flanges of said second pressed metal member lapping and permanently secured to the extremity of the cross frame member, together with bolts clamping the spring and the lapping horizontal portions of the two pressed metal members together.

In testimony whereof I affix my signature.

HARLIE H. HICKS.